April 25, 1944. H. C. WRIGHT ET AL 2,347,385
COOKING DEVICE
Filed June 11, 1938 5 Sheets-Sheet 2

Inventors
Horace C. Wright
& Ivar Jepson
By
McCanna, Wintercorn & Marsbach
Attys.

Patented Apr. 25, 1944

2,347,385

UNITED STATES PATENT OFFICE 2,347,385

COOKING DEVICE

Horace C. Wright and Ivar Jepson, Chicago, Ill., assignors to Chicago Flexible Shaft Company, Chicago, Ill., a corporation of Illinois Application June 11, 1938, Serial No. 213,206

27 Claims. (Cl. 99—338)

This invention relates to devices for heat treating articles, and more particularly to cooking devices, herein exemplified by a bread toaster.

An object of the invention is the provision of a generally improved cooking device wherein improved means are provided for controlling the degree of cooking, the manner of starting and terminating the cooking operation, the manner of inserting and removing the article to be cooked, and the manner of compensating for temperature changes in the cooking device.

Another object of the invention is the provision of an improved arrangement of cooking elements and improved means for mounting the same.

A further object of the invention is the provision of improved means for actuating the switch element of the cooking device.

We have also aimed to provide a toaster having improved means for moving the toast racks from position to position.

Another object is to provide a bread toaster having improved means for timing and actuating the same.

Another object of our invention is to provide what may be termed an automatic toaster in which the manual placing of a slice of bread in the toaster starts the mechanism through a cycle of operations during which the bread is toasted and made available for manual removal from the toaster. All of the operations are automatically performed in response to merely placing the bread in the toaster and removing it therefrom. Provision is also made for obtaining lighter or darker toast, according to the desire of the user.

Other objects and advantages will be apparent from the following description and the accompanying drawings, in which—

The embodiment of the invention herein shown is a toaster of the type adapted to receive either one or two slices of bread, the bread slices being inserted through slots in the top of the casing. According to the invention, the toaster has four cooking or toasting elements arranged in two pairs and adapted to receive a slice of bread therebetween for toasting purposes. A toast rack is provided having bread supporting portions positioned between each of the pairs of toasting elements, the rack being movable from an elevated bread receiving position and discharging position and a lower toasting position in which the entire slice of bread is in registration and toasting relationship with the toasting elements. In this instance the timing of the toasting interval is accomplished by means of an electric motor preferably a synchronous or clock type motor, and the toasting interval is always uniform. The degree of toasting is controlled by adjusting the distance between the toasting elements and the bread surface being treated, it being obvious that the toasting interval being uniform, the degree of toasting will vary directly with the distance between the toasting element and the bread surface opposed thereto. The arrangement is such that the insertion of a slice of bread into the toaster closes a switch which initiates operation of the motor and initiates the toasting elements. The motor during the first portion of its movement functions to move the toast rack from its elevated bread receiving position to its lower toasting position. The toast rack is retained in this position until substantially the end of the toasting interval, whereupon the motor functions to raise the toast rack almost, but not quite back to the toast receiving position, which position we term the toast discharging position. The switch is opened in response to movement of the toast rack to the latter position, thus terminating the toasting operation. Upon removal of the toast from the toast rack, the motor again starts, moving the toast rack back to its initial or toast receiving position, and resetting the parts for a subsequent toasting operation. Thermostat or temperature responsive means is provided for adjusting the positions of the toasting elements in response to changes in the ambient temperature within the toaster so as to maintain a uniform toasting effect upon successive toasting operations. In other words, it corrects for variations in the initial temperature of the toaster.

Figure 1:
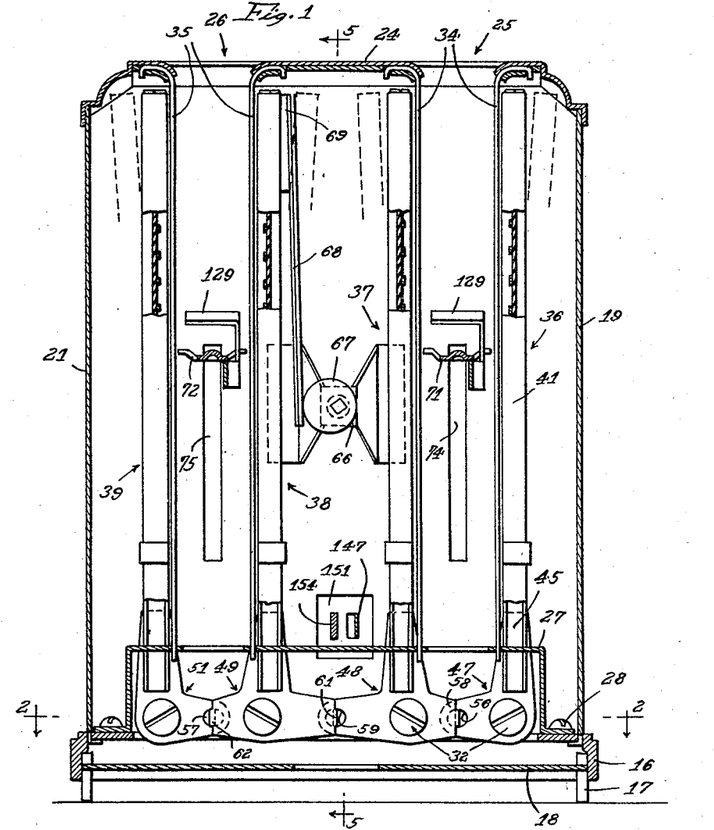
Figure 1 is a vertical section taken transversely through a toaster embodying the invention substantially on the line 1—1 of Fig. 5.
Figure 2:
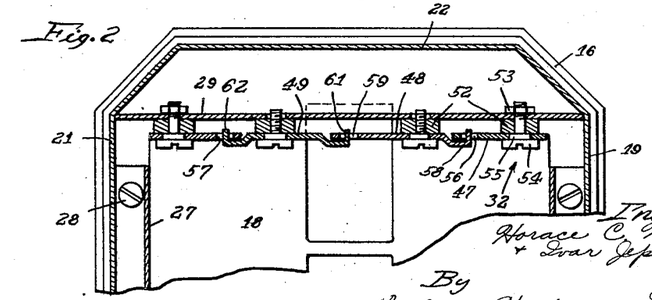
Fig. 2 is a fragmentary section taken on the line 2—2 of Figure 1.

We will now proceed to describe in detail the structure by which these operations are performed. Referring first to Figure 1, the toaster has in this instance a cast base designated generally by the numeral 16 provided with suitable legs 17 of insulating material for the purpose of spacing the bottom of the toaster from its supporting surface. A bottom plate 18 is provided for enclosing the bottom of the toaster. Positioned on the base 16 is an oven shell having side walls 19 and 21, end walls 22 and 23 and a top 24 provided with bread receiving openings 25 and 26, the shell preferably being secured together as a unitary whole. A frame plate 27 is positioned on the base, within the shell, by means of screws 28, and side frame members 29 and 31 are likewise secured to the base by means of bolts such as shown at 32. The frame members carry a top frame member 33 within which are secured a plurality of wires 34 and 35 on opposite sides of the toast receiving openings 25 and 26, the wires passing, near their lower ends, through openings in the bottom frame member 27. These wires serve as guides for confining the bread against lateral movement in the toaster. Positioned in parallel spaced relation within the shell are toasting elements 36, 37, 38 and 39, each of which in this instance includes a rectangular frame 41 within which is secured coplanar mica supports 42 and 43 upon which are wound resistance wire 44 in the usual manner, the winding being such as to provide substantially all of the resistance wire on one side of the mica so that each pair of toasting elements will provide opposed toasting surfaces. Each of the frames has depending side pieces 45 and 46 which are attached to linkage as best appears in Figs. 1 and 2. Thus, the depending side pieces of element 41 are affixed to links at opposite ends of the toaster, one of which is shown at 47, the toasting element 37 is attached to links 48, the element 38 to links 49, and the element 39 to links 51. These links are rotatably secured to the base 16 by means of the bolts 32, the bolts being seated in flanges 52 on the base 16. Each of these bolts has a threaded portion 53, a head portion 54 and a shoulder 55 which abuts against the flanges 52 to space the head from the flange and thus provide rotatable support for the links (note Fig. 2). The links 47 and 51, carrying opposite side toasting elements 36 and 39, are in the form of bell crank levers and have openings as shown at 56 and 57, respectively, on the end of one arm. The links 48 and 49 are T-shaped, the link 48 having a finger 58 for reception in the opening 56 of the link 47 and having an opening 59 in the opposed arm thereof. The link 49 has fingers 61 and 62 on opposed arms for reception in the openings 57 and 59 of the links 51 and 48, respectively. It will thus be seen that upon rotation of any one of the toasting elements about the bolt 32 a corresponding movement is imparted to the like element of the opposed pair, and an opposite movement of the same degree is imparted to the opposed element of each pair, this type of movement being shown in dotted lines in Figure 1.

Figure 5:
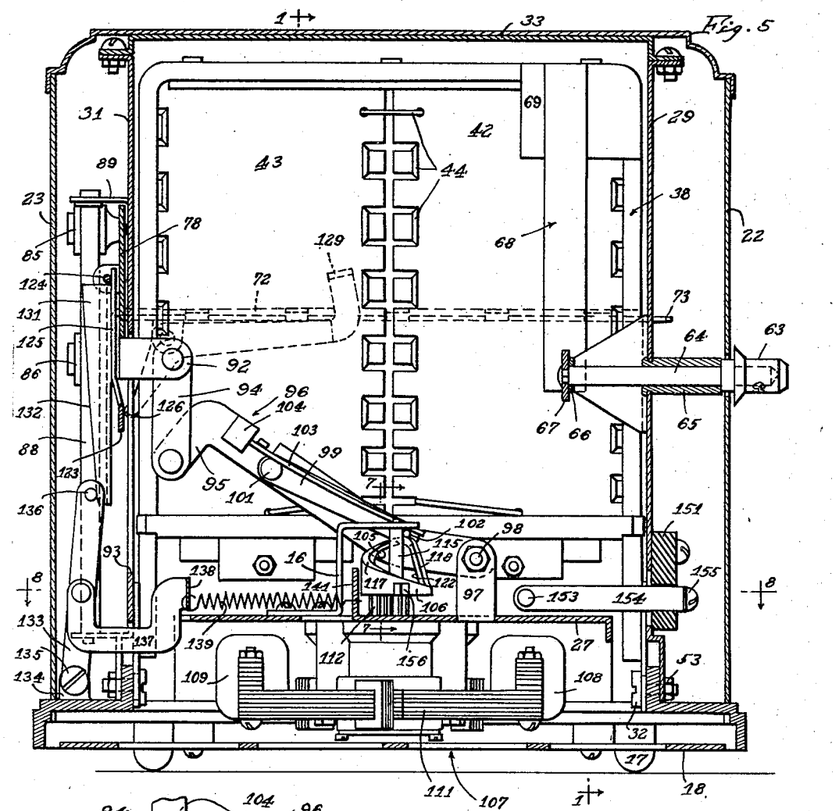
Fig. 5 is a section on the line 5—5 of Figure 1.

Manually operable adjustable means is provided for predetermining the position of the toasting elements which includes a knob 63 positioned on the exterior of the shell and secured to a shaft 64 mounted in bearings 65 and 66 secured to the end frame member 29 (Fig. 5). The inner end of the shaft 64 carries a circular adjusting cam 67 eccentrically positioned on the shaft as shown in Figure 1 adapted to bear against the side of a strip 68 adjacent the end thereof, one end of the strip being fixed to the toasting element 38 as shown at 69. By rotating the knob 63 rotation may be imparted to the toasting element 38 whereby adjustment of the operative position of each of the toasting elements of each pair 36—37 and 38—39 may be made. The toasting elements are so constructed as to normally gravitate away from each other toward the dotted line positions shown in Fig. 1; in other words, so as to press the strip 68 against the adjusting cam 67. The strip 68 is formed of bimetal or other thermostatic metal so that the relative positions of the cam 67 and the toasting elements will vary automatically in response to changes in the ambient temperature within the toaster. In other words, when the toaster is cold, the strip 68 will have one shape, whereas after the toaster has been heated up by successive toasting operations, the interior of the toaster will have assumed a different temperature and the strip 68 will have assumed a correspondingly different position (its lower end moving in a thermal response to the left with respect to its upper end, Fig. 1), thereby automatically adjusting the positions of the toasting elements in response to the temperature within the toaster.

Figure 12:
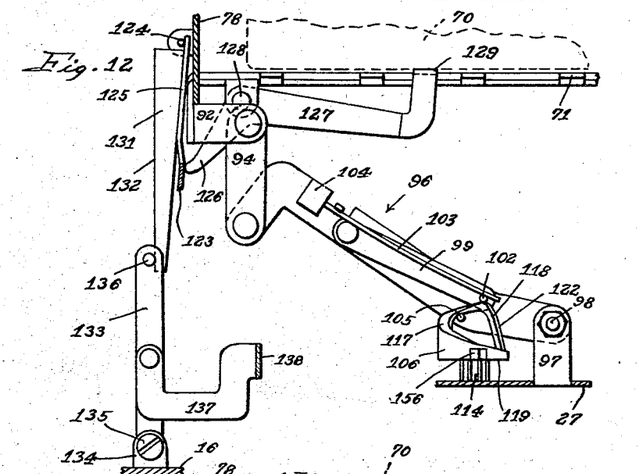
Figs. 12 to 15, inclusive, are fragmentary views showing the cam and toast rack actuating mechanism together with parts of the switch mechanism.
Figures 13, 14, 15:
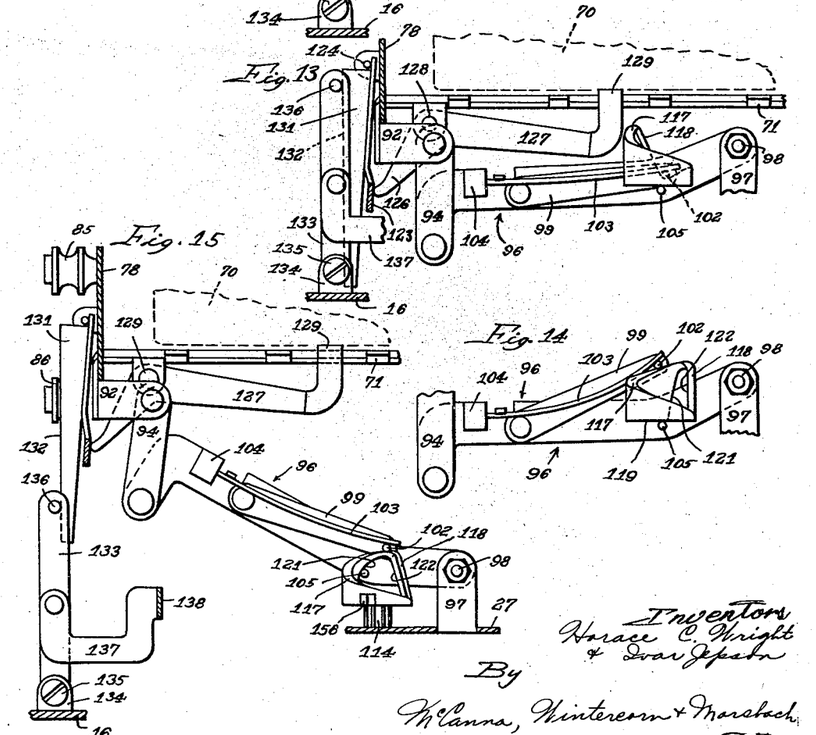

The bread is supported in the toaster on toast arms 71 and 72 positioned between the pairs of toasting elements, as indicated in dotted lines in Figs. 12, 13 and 15, the bread slices being indicated by the numeral 70, the arms having three ends 73 extending through slots 74 and 75 in the end frame member 29. The opposite ends 76 and 77 are secured to a plate 78 by means of screws 79, the ends projecting through slots 81 and 82 in the end frame member 31. The plate 78 has two pairs of vertically spaced rollers 83, 84, 85 and 86 adapted to ride on vertically disposed rods 87 and 88 affixed to the frame member 31, as shown at 89 and 91, the rods 87 and 88 serving to guide the toast rack including the toast arms 71 and 72 in vertical movement, the toast arms occupying the position shown in Figure 1 in the bread receiving position and a position adjacent the lower ends of the slots 74 and 75 in the toasting position. It will be seen that in the bread receiving position the distance from the toast arms to the top of the toaster is such that a normal slice of bread will project out of the top of the toaster, and in the toasting position the slice will be completely in registration and in opposition to the toasting elements.

Figure 6:
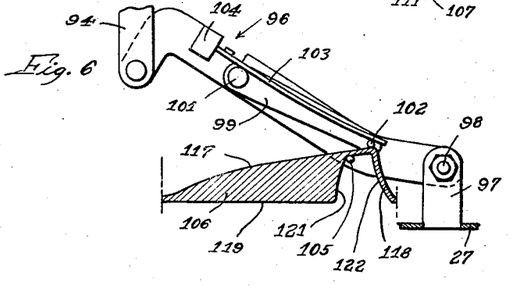
Fig. 6 is a fragmentary view showing the toast rack elevating lever and the associated cam, the cam being developed to show its cam surfaces.

An arm 92 is integral with the plate 78 and projects through a slot 93 in the frame member 31, the arm carrying a link 94 pivotally attached thereto and in turn pivotally secured to an end 95 of a toast rack elevating lever designated generally by 96. The opposite end of the lever 96 is pivotally secured to an ear 97 as shown at 98, the ear being integral with the frame base 27 (Fig. 5). A spring loaded lever 99 is pivotally attached to the lever 96 as shown at 101 and extends parallel with the lever 96 as best shown in Figs. 5 and 6. The free end of the spring loaded lever 99 has a pin 102 against which a spring 103 bears, the spring being affixed to the lever 96 at 104. The lever 96 also has a pin 105 adjacent the pin 102, and the spring 103 normally urges the lever 99 in a direction to engage the pin 105. The pins 102 and 105 are arranged to engage a driving cam 106 shown in developed form in Fig. 6.

Figure 7:
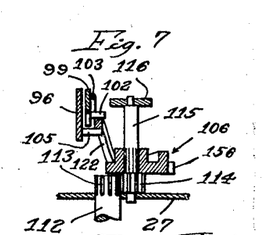
Fig. 7 is a section on the line 7—7 of Fig. 5.

The cam 106 is driven by a motor designated generally by the numeral 107 preferably in the form of a synchronous or clock motor, though not necessarily so. At all events, the motor should be capable of running at a fairly uniform speed under the load conditions applied thereto. In this instance the motor is of the synchronous type and has the usual field coils 108 and 109, field laminations 111 and motor shaft 112 (Fig. 7). The end of the shaft 112 is provided with teeth 113 meshing with a pinion 114 on a shaft 115 journaled at one end in the bottom frame member 27 and at the opposite end in a bracket 116 attached to the bottom frame member. The cam 106 is likewise secured to the shaft 115 so that the cam is rotated in response to operation of the motor 107. The cam has a top cam surface provided with a gradually sloping portion 117 and a portion 118 having an abrupt slope, the top cam surface being adapted for engagement by the pin 102. The cam also has a lower cam surface provided with a flat portion 119 and abruptly sloping portions 121 and 122, the lower cam surface being adapted for engagement by the pin 105. The toast rack lever 96 has associated parts together with the cam 106 serving to move the toast rack between its various positions, the motive power being provided by the motor 107.

Fig. 12 shows the parts in the bread receiving position with the cam 106 and the pins 102 and 105 in position to start the toasting operation. Upon energization of the motor in the manner which will presently be described, the cam 106 starts its rotation, rotating in a direction from left to right facing Figs. 12 to 15. During the initial part of the rotation of the cam the pin 102 moves down the cam surface 118, initially under the weight of the toast rack. A moment thereafter the pin 105 engages against the cam surface 122 forcing the lever 96 and the toast rack downward unless such movement has already occurred under the force of gravity. Upon continued rotation of the cam, the pin 105 engages the flat cam portion 119 preventing upward movement of the lever 96 and at the same time the pin 102 is engaged by the gradually sloping cam surface 117 and is gradually moved in a counter-clockwise direction facing Fig. 12 against the tension of the spring 103, thereby tensioning the spring 103.

Fig. 13 shows the parts in the position at which the pin 102 occupies its lowermost point, and the pin 105 has just engaged the portion 119. In this position of the lever 96 the toast arms and remainder of the toast rack occupy the toasting position as shown in Fig. 13. As the cam continues to rotate, the lever 99 is gradually rotated with respect to the remainder of the lever 96 and the spring 103 is tensioned until the parts reach the position shown in Fig. 14, at which the pin 105 is about to engage the lower cam portion 121 and to move off the flat surface 119. As the pin 105 engages the cam portion 121, the tension of the spring 103 causes the lever 96 to be raised, thus moving the toast rack and arms 71 upward to the position shown in Fig. 15, at which point the motor and the toasting elements are deenergized, the completed toast being raised to a position in which it can be removed from the toaster through the slots 25 and 26. Upon the removal of the toast, the motor is again energized by means presently to be described, causing the cam to rotate a short distance to the position shown in Fig. 12, causing a further slight relative movement between the pins 102 and 105 and the cam, at which point the parts are re-positioned for a succeeding toasting operation.

Figure 3:
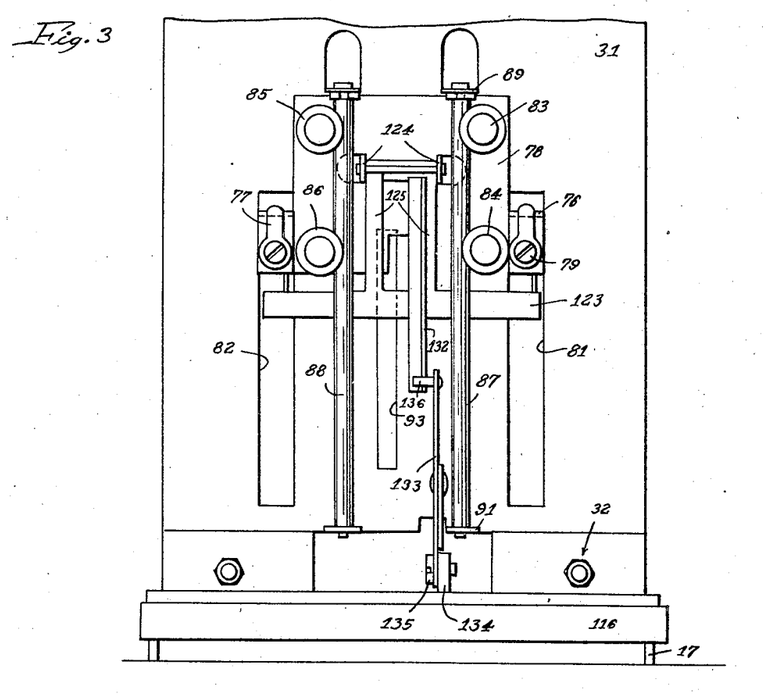
Fig. 3 is a fragmentary face view of one end of the toaster with the shell removed.
Figure 4:
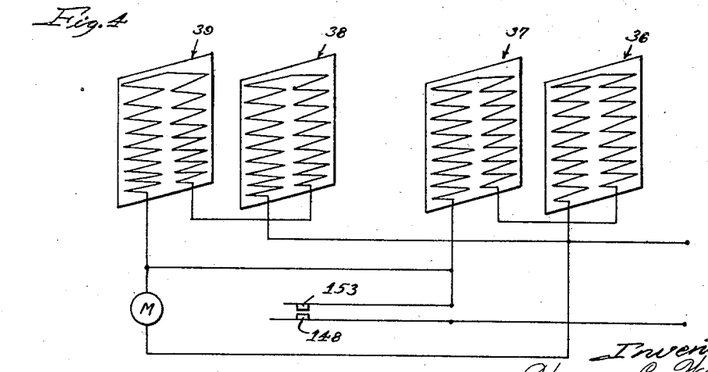
Fig. 4 is a wiring diagram of the toaster.
Figure 8:
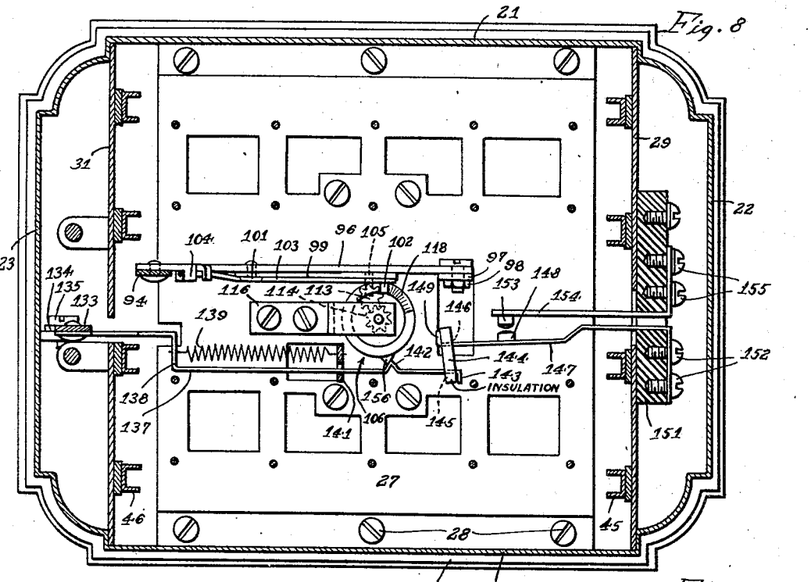
Fig. 8 is a section on the line 8—8 of Fig. 5.
Figure 9:
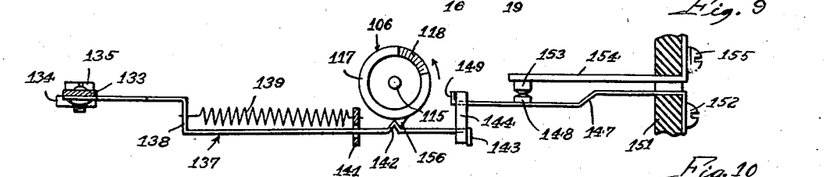
Figs. 9 to 11, inclusive, are fragmentary views of the switch and switch actuating mechanism showing the parts in moved position.
Figure 10:
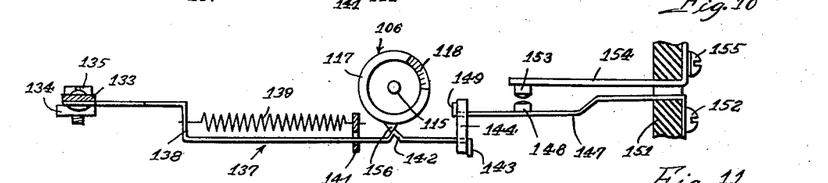
Figures 11, 16:
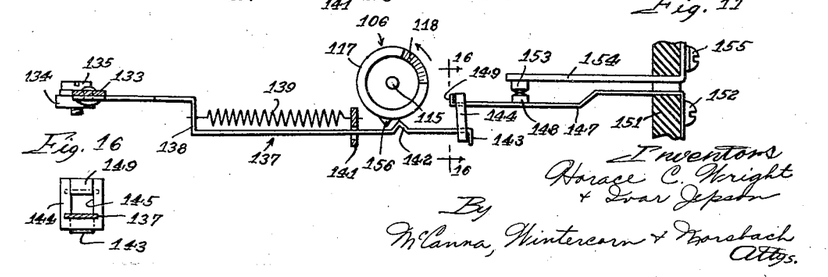
Fig. 16 is a view taken on the line 16—16 of Fig. 11 showing the face of the switch link.

Directing attention now more particularly to the switch actuating mechanism and the means for controlling the operation of the motor through its various steps, the plate 78 of the toast rack has a cross-arm 123 (Figs. 3 and 5) pivotally supported on the plate as shown at 124 by means of arms 125. The cross-arm 123 is positioned for engagement by the end 126 (Figs. 12 to 15) of a weight actuated lever 127 pivotally supported at 128 on each of the toast arms 71 and 72, the opposite end 129 of the lever normally resting above the toast arms as shown in Figure 1 when the toaster is unoccupied, but adapted to be rotated to the position shown in Fig. 12 under the weight of a slice of bread. The cross-arm 123 carries a cam bar 131 having a cam surface 132 extending vertically in the line of travel of the toast rack and adapted to move about the pivotal support 124 of the cross-arm 123. A lever 133 is pivotally attached to a lug 134 on the base 16 by means of a screw 135 and has a pin 136 projecting laterally therefrom and adapted to bear against the cam surface 132 and to slide thereover in the up and down movement of the toast rack. Pivotally secured to the lever 133 intermediate its ends is a switch actuating lever 137 extending horizontally along the bottom frame member 27, the lever having a right angled bend 138 intermediate its ends for engagement by a spring 139, the opposite end of which engages an ear 141 fixed on the bottom frame member 27, the spring normally tending to pull the lever 137 to the right facing Figs. 8 to 15, inclusive. The lever 137 has a shoulder 142 opposite the cam 106, the lever extending by the cam and in close proximity to one side thereof, as will be seen from Fig. 8. The free end of the lever 137 is bent outwardly at right angles as shown at 143, and the lever loosely carries a block of insulation material 144 having a rectangular slot 145 therein. Also loosely received in the slot 145 is the end of one blade 147 of a switch, one of the contacts 148 of the switch being carried on the blade 147 and the blade being bent over at its end as shown at 149 to retain the block 144 thereon. The opposite end of the switch lever 147 is supported on a block of insulation 151 having screws 152 for the attachment thereto of electrical conductors, as will be seen from the wiring diagram. The opposed contact 153 is rigidly carried on a rigid blade 154 which is likewise supported on the block of insulation 151 by means of screws 155, which likewise serve for the attachment of suitable conductors. The cam 106 has a tit 156 positioned on the cam in the position shown in Fig. 8 and adapted to engage the shoulder 142 as shown therein in the normal "off" position of the toaster. When a slice of bread is inserted into the toaster on either one or both of the toast arms, either one or both of the levers 127 are rotated to the position shown in Fig. 12. Thereupon the end or ends 126 of the levers move the cross-arm 123 outward to the position shown in Fig. 12, thereby moving the switch actuating lever 137 to the left facing Figs. 8 to 15, through the cam bar 131, the pin 136 and the lever 133.

causing the shoulder 142 to move over the tit 156 from the position shown in Fig. 8 into the position shown in Fig. 9, thereby closing the contacts 148 and 153 and energizing both the toasting elements and the motor. The cam 106 thereupon rotates in the manner heretofore described, lowering the toast and subsequently raising the toast rack to the toast discharging position corresponding to Fig. 15. As the cam approaches this position, the tit 156 engages the shoulder 142, moving the switch actuating lever 137 laterally to thereby distort the blade 148 and open the contacts 148 and 153 to deenergize the toasting elements and the motor (note Fig. 10). The parts remain in this position until the user removes both of the slices of toast so as to permit both of the levers 127 to return to the positions shown in Figs. 1 and 5. Under these circumstances the ends 136 of the levers permit the cross-arm 123 to return to the position shown in Fig. 5, whereupon the lever 133 rotates in a clockwise direction under the action of the spring 139, and the switch actuating lever 137 moves toward the right facing Figs. 8 to 15 into the position shown in Fig. 11, whereby the spring tension of the blade 147 closes the contacts 148 and 153, again energizing the motor for the short interval required for the cam 106 to travel from the position shown in Fig. 11 to the position shown in Fig. 8, whereupon the tit 156 again engages the shoulder 142 causing the opening of the contacts 148 and 153 and returning the parts to the positions shown in Figs. 5 and 8.

It will be seen that the device is entirely automatic in operation with the exception of the act on the part of the operator of selecting the particular degree of brownness desired in the finished product. A dial or color chart may be associated with the knob 63 and this is employed for the purpose of designating the color of toast desired. Thereafter the operator merely drops one or two slices of bread into the toaster. No act is required to initiate the operation of the toaster or to terminate the operation. When the bread is inserted, the operation proceeds to completion without manual attention, and the finished toast is raised from the toaster and presented in an accessible position for manual removal by the operator. These operations are conducted in substantially a soundless fashion. The means for compensating for temperature changes in the toaster is of simple construction and efficient in operation. A feature of the cooking device is the simplicity of construction and the attendant trouble-free and uniform operation.

We have described and illustrated a specific embodiment of the invention by way of illustration, but the invention is generally applicable to cooking devices and we do not wish to be limited except as required by the prior art and the appended claims, in which—

We claim:

1. The combination in a cooking device of spaced heating elements for performing a cooking operation on an article therebetween, means for terminating the cooking operation upon the lapse of a predetermined time, manually operable means for regulating the distance between the heating elements and the object to select the degree of cooking, and temperature responsive means for regulating said distance in response to change in the ambient temperature in said device.

2. The combination in a cooking device of spaced heating elements, a motor for timing the cooking intervals of the device, means for starting the motor in response to positioning an article in an initial position to start the cooking interval, and means driven by the motor for transporting the article from said initial position to a stationary cooking position between said elements at the start of a cooking interval and from said cooking position back to a point in close proximity to said initial position upon the termination of the cooking interval.

3. The combination in a cooking device of spaced heating elements, a motor for timing the cooking intervals of the device, means for starting the motor in response to positioning an article in an initial position to start the cooking interval, means driven by the motor for transporting the article from said initial position to a stationary cooking position between said elements at the start of a cooking interval and from said cooking position toward said initial position to remove the article from the oven upon the termination of the cooking interval, and means for terminating the operation of said motor after said last mentioned movement.

4. The combination in a cooking device of spaced heating elements, a motor for timing the cooking intervals of the device, means for initiating a cooking interval in response to positioning of an article in an initial position, and means driven by the motor for transporting the article from said initial position to a cooking position between said elements at the start of a cooking interval and to an intermediate position upon the termination of the cooking interval, said starting means including means for initiating movement of said transporting means to said initial position in response to removal of said article to reposition the parts for a subsequent cooking interval.

5. The combination in a toaster of spaced heating elements, an electric motor for timing the toasting intervals, means driven by the motor for moving the bread in step fashion between a stationary toasting position and a stationary removing position, a switch actuated in response to insertion of a slice of bread into the toaster for starting the motor, and means operative in response to movement of bread to toast removing position for stopping the motor at the close of the toasting interval.

6. The combination in a toaster of spaced heating elements, a toast rack positioned therebetween for movement between an initial bread receiving position, a toasting position, and a toast discharging position, a motor for timing the toasting intervals, means driven by the motor for moving said toast rack from said initial position to said toasting position at the start of the cooking interval and for moving said rack from the toasting position to the toast discharge position at the termination of each toasting interval, means for initiating operation of the motor in response to the insertion of a slice of bread in said bread receiving position, and means for initiating the operation of said motor in response to removal of the toast for movement of the rack to said initial position to reposition the parts for a subsequent toasting operation.

7. The combination in a toaster of spaced heating elements, a toast rack positioned therebetween for movement between stationary initial and toasting positions, a motor for timing the toasting interval, a cam driven by the motor through one revolution during each toasting interval, means operated by the cam for moving the toast rack between said positions during each toasting interval, a switch operated in response to positioning a slice of bread on said rack in said initial position for starting said motor, and means driven by the motor for actuating said switch to terminate the operation of the motor when the toast rack returns to said initial position.

8. The combination in a toaster of spaced heating elements, a toast rack positioned therebetween and movable between an initial bread receiving position, a toasting position and an intermediate toast discharging position, a motor for timing the toasting intervals, a cam driven by the motor through one revolution during each toasting interval, means driven by the cam for moving said rack between said positions, a switch for controlling the operation of said motor, means for closing said switch in response to positioning the slice of bread on said rack in the initial position, means driven by the motor for opening said switch when the toast rack reaches said intermediate position, means for closing said switch in response to the removal of the toast, and means for opening said switch when the toast rack reaches said initial position.

9. The combination in a toaster of spaced heating elements, a toast rack positioned therebetween for bodily movement between an elevated initial bread receiving position and a lowered toasting position, a motor for timing the toasting interval, a cam driven by said motor through one revolution during each toasting interval, means driven by said cam for lowering said rack at the start of a toasting interval and raising the same at the termination thereof, said means including spring means arranged to be tensioned by operation of said cam during movement of the toast rack to the lower toasting position to store energy to assist in movement of the toast rack to the elevated initial position, and means on said cam for terminating the toasting interval.

10. The combination in a toaster of a toasting chamber, a plurality of flat vertically disposed laterally spaced heating elements, means for pivotally supporting said heating elements on a horizontal axis near the bottom of said chamber for movement toward and away from each other, laterally disposed pivotally interconnected means on said heating elements arranged to cause said elements to rotate in opposite directions to vary the space therebetween in the upper parts thereof, a thermostat means responsive to the temperature in said chamber for rotating said elements on said pivotal supports to maintain uniform successive degree of toasting.

11. The combination in a vertical type toaster of a casing forming a toasting chamber having openings on the top thereof for the insertion of a bread slice partway into said chamber to an initial position, a toast rack positioned within said chamber for movement between an initial position and a lowered toasting position, means including an electric motor operating continuously during each toasting interval for lowering said toast rack from said initial position to said toasting position, retaining the racks stationary in said toasting position and returning said rack toward said initial position at the close of a toasting interval, a switch for said motor, a lever carried on said toast rack positioned to actuate said switch under the weight of a slice of bread to start said motor in said initial position, and means other than said lever for actuating said switch to stop said motor upon return movement.

12. Toasting apparatus embodying therein means providing a source of heat, bread supporting means, power means, means operative when connected to said power means for moving said first two mentioned means relatively to provide a bread receiving position and a bread toasting position for said bread supporting means, said fourth mentioned means including a part requiring manual operation for connecting the same to said power means.

13. Toasting apparatus embodying therein means providing a source of heat, bread supporting means movable from a bread receiving position to a bread toasting position with respect to said source of heat, power means, means operative when connected to said power means for moving said bread supporting means from the bread receiving position to the bread toasting position, said fourth mentioned means including a part requiring manual operation for connecting the same to said power means.

14. Toasting apparatus embodying therein means providing a source of heat, bread supporting means, means for controlling said source of heat, power means, means operative when connected to said power means for moving said first two mentioned means relatively to provide a bread receiving position and a bread toasting position for said bread supporting means and to actuate said controlling means for said source of heat, said fifth mentioned means including a part requiring manual operation for connecting the same to said power means.

15. Toasting apparatus embodying therein means providing a source of heat, means for controlling said heating means, bread supporting means movable with respect to said source of heat, from a bread receiving position to a bread toasting position, power means, means operative when connected to said power means for moving said bread supporting means from said bread receiving position to said bread toasting position and to actuate said controlling means for said source of heat, said fifth mentioned means including a part requiring manual operation for connecting the same to said power means.

16. Toasting apparatus embodying therein means providing a source of heat, bread supporting means, power means, means operative when connected to said power means for moving said first two mentioned means relatively to provide a bread receiving position and a bread toasting position for said bread supporting means, said fourth mentioned means including a part requiring manual operation for connecting the same to said power means for moving said first two mentioned means relatively to provide the bread toasting position for the bread supporting means and for controlling the period of time said bread supporting means remains in said toasting position, and means operating automatically through said part of said fourth mentioned means at the expiration of said period of time for moving said two first mentioned means relatively to provide the bread receiving position for said bread supporting means.

17. Toasting apparatus embodying therein means providing a source of heat, bread supporting means movable with respect to said source of heat from a bread receiving position to a bread toasting position, power means, means operative when connected to said power means for moving said bread supporting means from the bread receiving position to the bread toasting position, said fourth mentioned means including a part requiring manual operation for connecting the same to said power means for moving said bread supporting means from its bread receiving position to its bread toasting position and for controlling the period of time said bread supporting means remains in said toasting position, and means operating automatically through said part of said fourth mentioned means, at the expiration of said period of time for moving said bread supporting means back to its bread receiving position.

18. A toaster having, in combination, a bread support, electric heater means for toasting bread, and mechanism for effecting automatic operations including an electric motor, cam means operated by the motor having cam faces for effecting controlled movement relatively between the bread support and the heater means, an electric circuit for the motor and heater means including a switch for closing and opening the circuit, and a switch actuating member mounted on the bread support for actuation with respect thereto and adapted to be actuated in response to placing a slice of bread on the support for closing the switch, said member being subsequently actuated in response to removal of the toasted slice from the bread support to cause opening the switch.

19. A toaster as set forth in claim 18, in which the cam faces are constructed and arranged for automatically moving the bread support in a sequence of operations, including moving the bread support from a bread receiving position to a toasting position and maintaining the bread support for a controlled interval in said toasting position.

20. A toaster as set forth in claim 18, in which the cam faces are constructed and arranged for automatically moving the bread support in a sequence of operations, including moving the bread support from a bread receiving position to a toasting position and maintaining the bread support for a controlled interval in said toasting position, and for moving the bread support to a toast discharging position.

21. A toaster as set forth in claim 18, in which both the heater and the motor are deenergized by opening the switch independently of said switch actuating member upon movement of the bread support to a toast discharging position.

22. A toaster as set forth in claim 18, in which both the heater and the motor are deenergized by opening the switch independently of said switch actuating member upon movement of the bread support to a toast discharging position, said switch actuating member operating in response to removal of the toasted bread from the support to close the switch for a second sequence of operations including operation of the motor to raise the bread support to said bread receiving position and restoring the mechanism to starting condition.

23. A toaster having a toasting compartment, a bread support movable to toasting and non-toasting positions relative to said compartment, power operated means for so moving the bread support including an electric motor, a cam structure coaxial with and driven by the motor having a control surface for determining the length of the toasting period, and means coacting between said cam structure and the bread support for controlling movement of the latter.

24. A toaster as set forth in claim 23, in which the cam structure makes substantially a complete revolution for each cycle of operations of the toaster and in which the cam structure has cam portions for causing the bread support to be moved to the toasting position and from the latter to the non-toasting position.

25. A toaster as set forth in claim 23, in which the cam structure has cam portions for causing the bread support to be moved to the toasting position and from the latter to the non-toasting position, and in which the heating means for performing the toasting function is deenergized in response to movement of a cam on the cam structure.

26. In a bread toaster, in combination, a toasting compartment, spaced heating elements for toasting an interposed slice of bread, a timer for establishing intervals of time action of said heating elements, and thermally responsive means for varying the relative spacing of the heating elements with respect to the bread slice to produce a substantially uniform degree of toasting in successive toasting operations.

27. An automatic toaster having, in combination, a toasting compartment, supporting means for supporting a slice of bread in said compartment, heating means for toasting said slice of bread in said compartment, and control mechanism for controlling a toasting cycle including control means responsive to insertion of said slice of bread into said supporting means for energizing said heating means to initiate a toasting operation, and means operative while said bread is supported in said supporting means for de-energizing said heating means at the end of said toasting operation, said control means being responsive to removal of said slice of bread from said supporting means to reset said mechanism for again energizing said heating means upon the insertion of a slice of bread.

HORACE C. WRIGHT.
IVAR JEPSON.